April 12, 1960     A. J. LORENZO     2,932,059

LONGBURGER PICKER AND MOLD COMBO TOOL

Filed June 26, 1958

United States Patent Office 2,932,059
Patented Apr. 12, 1960

2,932,059

LONGBURGER PICKER AND MOLD COMBO TOOL

Angelo J. Lorenzo, Joliet, Ill.

Application June 26, 1958, Serial No. 744,879

1 Claim. (Cl. 17—32)

The invention relates to a picker and molding tool combination.

The primary object of the invention is the provision of an implement of this character wherein a longburger can be molded into equal sizes and served the same. The implement being constructed of such that a longburger may also be picked up or turned over while being cooked or served.

Another object of the invention is the provision of an implement of this character wherein a longburger is being processed without being in contact of the human hand except for the wax paper being used between molds.

A further object of the invention is the provision of an implement of this character which is easily operated, durable in its construction and inexpensive to manufacture.

With these and other objects in view, the invention consists in the features of construction, be hereinafter more fully described in detail, illustrated in the accompaying drawing, which discloses the preferred embodiment of the invention, and pointed out in the claim hereunto appended.

Figure 1:
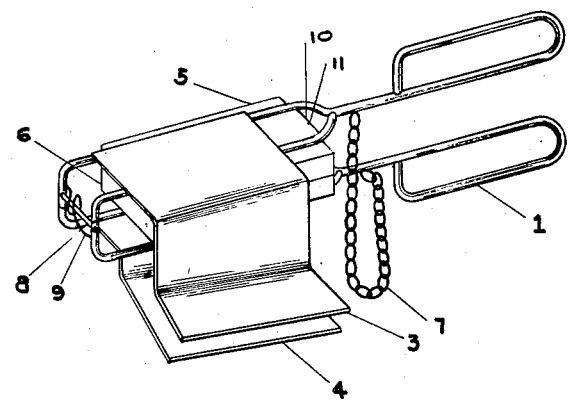
Figure 1 is a perspective view of the implement constructed in accordance with the invention.
Figure 2:
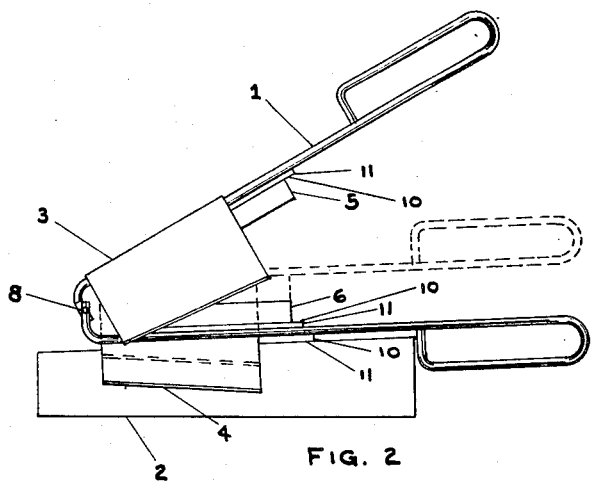
Figure 2 is the same perspective view except for implement being open as a picker or implement may be opened wider by the person operating said implement to mold a longburger.
Figure 3:
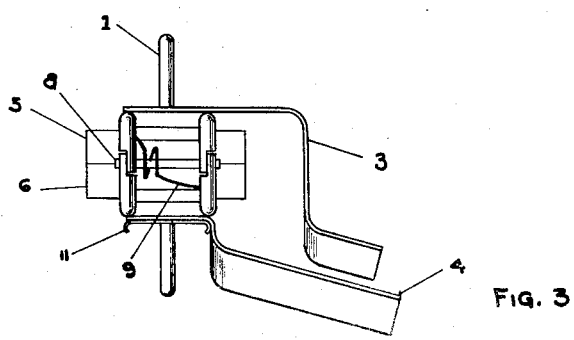
Figure 3 is an end view of the implement, similar reference characters indicate corresponding parts throughout the several views in the drawing.

Referring to the drawing in detail the implement comprised of a mounting base 2 with slight slope towards the left edge of base, square and of stainless steel construction, angled on two sides to screw down on work bench, using channel 10 on top of mounting base 2.

Attached to mounting base 2 is tool with two handles section 1 channel 11 is welded or brazed under tool section 1 holding handles together is a bearing pin 8 with peen ends and a spring 9 slipped over bearing pin 8 with ends soldered one on each handle to create spring tension to force open handles of section 1.

The top part of picker 3 is welded or brazed to section 1 top handle and is an actuating piece when thumb is inserted in top handle to open picker.

The bottom part of picker 4 is also welded or brazed to section 1 bottom handle, bottom part of picker 4 and top part of picker 3 are both bent to proper angles in order for operator to pick up and turn longburger in a compressed position while cooking and also handy when releasing same into hot dog bun.

The top part of mold 5 constructed of hardwood is riveted to channel 10 which in turn is slid into channel 11 brazed or welded on section 1 top handle. Bottom part of picker is also used in loosening longburgers while in the process of cooking.

The bottom part of mold 6 is constructed in the same manner riveted to channel 10 and slipped into channel 11 brazed or welded on section 1 bottom handle.

When molding longburgers, tool section 1 is then slipped over mounting base 2 limit chain 7 which controls picker from opening too far can be shortened or lengthened to the users' advantage, but in the case of molding longburgers limit chain 7 is completely disconnected from tool section 1. By placing ingredients over waxed paper in mold 6, the user places wax paper over ingredients, then brings down top handle section 1 with top mold 5 inserted over mold 6 compressing and then decompressing bringing top handle section 1 back up and over both top mold 5 and bottom mold 6 may remain in tool section 1 or may be detached.

What is claimed is:

An implement of the character described including a pair of longitudinally extending top and bottom wire members, each of said wire members having at one end thereof a turned-back portion forming a handle and having pivot means at the other end thereof for pivotally connecting said members, spring means adjacent said pivot means tending to force said handles into open position, a mold member removably mounted on each of said wire members intermediate said ends and in mating relation to form a mold cavity for molding ground meat, each of said wire members having an angular member extending outwardly and downwardly from one side thereof, said angular members terminating in spaced parallel relationship to serve as a turning means for molded ground meat, chain means extending between said wire members for limiting the opening of said wire members by said spring, and female channel means formed on said bottom wire member adapted to cooperate with a male channel means for mounting said tool on a support.

References Cited in the file of this patent

UNITED STATES PATENTS

| | | |
|---|---|---|
| 1,931,388 | Ling | Oct. 17, 1933 |
| 2,081,080 | Baker | May 18, 1937 |
| 2,190,236 | King et al. | Feb. 13, 1940 |
| 2,447,245 | Garland | Aug. 17, 1948 |